United States Patent [19]
Nicholson

[11] 3,910,314
[45] Oct. 7, 1975

[54] HIGH-SPEED SHUTOFF AND DUMP VALVE

[75] Inventor: Robert D. Nicholson, Birmingham, Mich.

[73] Assignee: Koehring Company, Milwaukee, Wis.

[22] Filed: Aug. 16, 1973

[21] Appl. No.: 388,897

[52] U.S. Cl. ...................... 137/625.62; 137/625.64
[51] Int. Cl.² ......................................... F16K 11/07
[58] Field of Search ............ 137/625.61, 625.62, 85, 137/86, 625.63, 625.64; 91/359

[56] References Cited
UNITED STATES PATENTS
2,924,241  2/1960  Bauer ........................ 137/625.62 X Primary Examiner—Henry T. Klinksiek
Attorney, Agent, or Firm—Whittemore, Hulbert & Belknap

[57] ABSTRACT

A high-speed shutoff and dump valve operable in response to a change in input parameters thereto to shut off a flow of hydraulic fluid under pressure therethrough, having regenerative shutoff actuation and providing a fluid under pressure out, dump function on actuation. In a first modification of the valve, fluid under pressure out, is shorted to, fluid return, on actuation of the valve, while in a second modification, fluid under pressure out, and fluid return are sealed on actuation of the valve. In application, the high-speed shutoff and dump valve may be used before or after an electrohydraulic servo valve in an electrohydraulic system to control the flow of fluid through the servo valve in accordance with the presence or absence of an electrical feedback signal to the servo valve.

19 Claims, 5 Drawing Figures

3,910,314

HIGH-SPEED SHUTOFF AND DUMP VALVE

BACKGROUND OF THE INVENTION

1. Field of the Invention

The invention relates to electrohydraulic valves and refers more specifically to an electrohydraulic valve having a force motor portion and a hydraulic portion with the hydraulic portion having main metering and pilot sections, which valve includes means for rapidly moving a spool valve in the main metering section from an open position to a closed position at an acceleration rate which increases regeneratively in response to a predetermined change in electrical input thereto whereby fluid flow under pressure into the valve is shut off and fluid flow under pressure out of the valve is dumped to fluid return from the valve or is shorted to fluid return from an actuator to which the valve is connected or fluid flow under pressure out of the valve and fluid return to the valve are sealed, and which valve includes an adjustable floating valve seat.

2. Description of the Prior Art

In the past, available fluid shutoff and dump valves have often been slow acting so that where rapid shutoff and dumping has been required to prevent damage to equipment or workpieces, the action of the valve has not always taken place in time to prevent such damage. Also in the past, fluid shutoff and dump valves have not generally included pilot sections in addition to main metering sections, nor have they been provided with regenerative actuation whereby on initial actuation the net forces causing the actuation increase to speed the actuation of the valve. Further, such valves of the past have usually included fixed position valve seats.

SUMMARY OF THE INVENTION

The high-speed shutoff and dump valve of the invention includes a force motor portion and a hydraulic portion. The hydraulic portion of the valve includes a pilot section and a main metering section. The main metering section has a spool valve member normally biased in a valve open position against a floating valve seat, one limiting position of which valve seat is adjustable. The pilot section of the valve is responsive to an electrical input signal to the force motor portion of the valve to initiate regenerative actuation of the valve to move the spool valve member to a closed position whereby fluid flow under pressure into the valve is shut off and fluid flow under pressure out of the valve is dumped to fluid return from the valve.

The high-speed shutoff and dump valve of the invention may be used to monitor fluid flow through an electrohydraulic servo valve metering fluid into a hydraulic actuator. In such systems if the electrical signal to the servo valve is cut off, it is often desirable to immediately cut off the hydraulic flow through the servo valve to the actuator. The high-speed shutoff and dump valve of the invention can be used before or after the servo valve in such a system and can be made responsive to the loss of a feedback signal to the servo valve.

In one modification of the high-speed valve of the invention, on movement of the spool valve member to a closed position, means are provided for shorting fluid under pressure out of the valve to the return fluid from an actuator connected to receive fluid from and return fluid to the valve on actuation of the valve. In another modification of the high-speed valve, fluid under pressure out of the valve and return fluid to the valve are both blocked on actuation of the valve.

DESCRIPTION OF THE PREFERRED EMBODIMENTS

Figure 1:
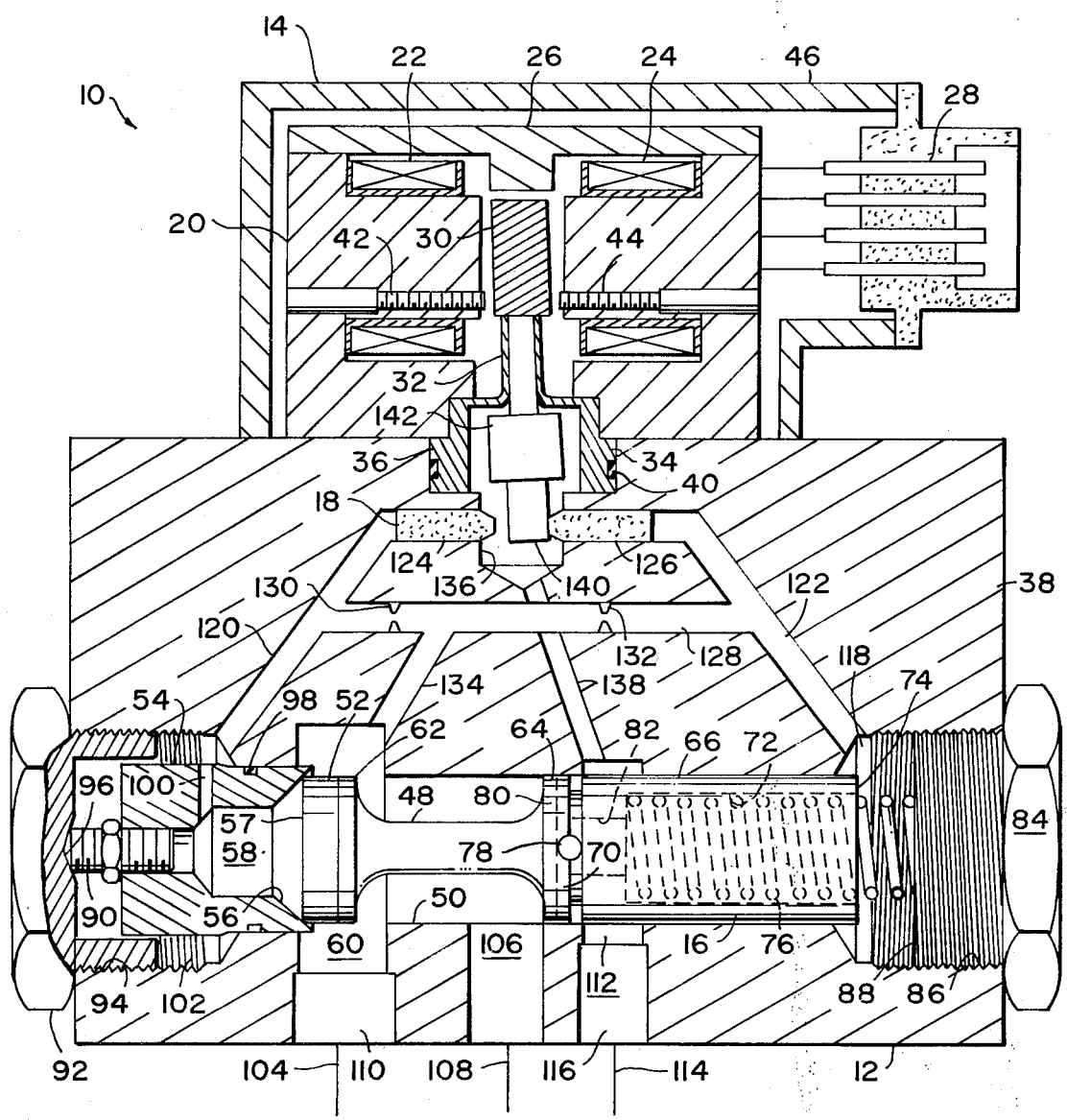
FIG. 1 is a diagrammatic, longitudinal section view of an open electromechanical, high-speed shutoff and dump valve constructed in accordance with the invention and showing the valve open.

The high-speed shutoff and dump valve 10 shown in FIG. 1 includes a hydraulic portion 12 and a force motor portion 14. The hydraulic portion 12 includes a main metering section 16 and a pilot section 18.

Figure 2:
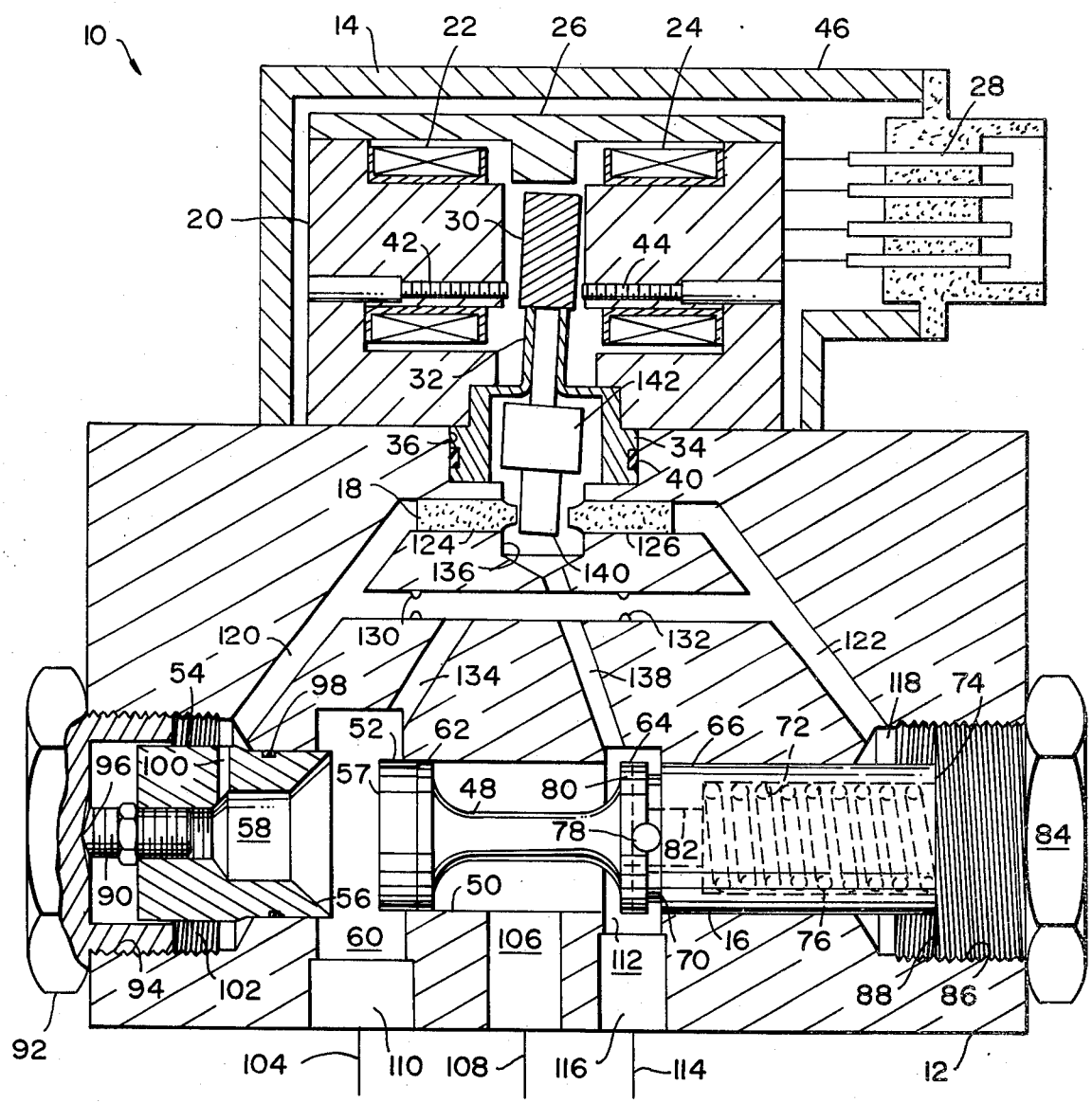
FIG. 2 is a diagrammatic, longitudinal section view of the high-speed shutoff and dump valve of FIG. 1, but showing the valve closed or shut off.

The force motor portion 14 includes a core 20 of soft iron or other magnetically permeable material having the actuating coils 22 and 24 wound thereon and a permanent magnet 26 having the configuration and arranged as shown in FIGS. 1 and 2. The coils 22 and 24 are connected to an external source of electrical energy (not shown) through terminals 28 in a known manner.

Force motor 14 further includes an armature 30 supported on a flexure tube 32 between the coils 22 and 24 in close proximity to the core 20 and permanent magnet 26. The flexure tube 32 has an enlarged cylindrical portion 34 at one end thereof which fits within the recess 36 in the valve body 38. The flexure tube 32 in conjunction with the armature 30 and the O-ring 40 provides a seal between the electrical and hydraulic portions of the high-speed shutoff valve 10. The flexure tube also provides a pivot for movement of the armature 30 in accordance with the flux fields induced by the magnet 26 and the coils 22 and 24 about the armature 30.

The permanent magnet 26 induces two separate counterrotational flux fields in the core 20 resulting in fields of opposite directions on the two sides of the armature. The coils 22 and 24 induce a flux field whose circuit passes through the base of the core 20 and straight through the armature 30. The coil induced flux is proportional to the current in the coils 22 and 24 and increases the flux on one side of the armature 30 and decreases the flux on the other side causing an unbalanced force and motion of the armature.

The limiting positions of the armature 30 on pivoting due to electrical energy applied to the coils 22 and 24 or due to the bias applied by the permanent magnet 26 is provided by the adjusting screws 42 and 44 which are accessible on removal of the housing 46 of the force motor 14.

In operation of the force motor portion 14 of valve 10 with no electrical signal provided to the coils 22 and 24 through the terminals 28, armature 30 will be pivoted into the position shown in FIG. 2 due to the flux field of the permanent magnet 26 through the core 20. On energizing the coils 22 and 24, the armature 30 will be pivoted in opposition to the bias of the permanent magnet 26 into the position shown in FIG. 1.

The construction and operation of such force motors is known and will therefore not be considered in further detail herein. For details of one such force motor, reference is made to U.S. Pat. No. 2,859,391.

The main metering section 16 of the hydraulic portion 12 of the valve 10 includes the spool valve member 48 positioned in the cylindrical opening 50 through the valve body 38. The spool valve 48 is engageable about the periphery of end 57 thereof with a conical valve seat surface 56 on a floating valve seat member 54, with the spool valve 48 in an open position thereof as shown in FIG. 1 to seal the chamber 58 in the floating valve seat member 54 from the annular chamber 60 in the valve body 38.

Land 52 provided on end 57 of the spool valve 48 has a slightly tapered portion 62 thereon to facilitate movement of the land 52 into the cylindrical opening 50 from the chamber 60 on movement of the spool valve 48 to the right in FIG. 1. Spool valve 48 also includes lands 64 and 66 at the other end thereof separated by the annular groove 70.

The spool valve 48 is provided with a dual diameter recess 72 in the end 74 thereof for receiving the spring 76 biasing the valve member 48 to the left in FIG. 1. Crossed openings 78 and 80 are also provided in the spool valve 48 providing communication between the annular groove 70 and the smaller diameter portion 82 of the recess 72.

End 74 of the spool valve 48 is engageable by the valve end cap 84 threaded into an enlarged diameter portion 86 of the cylindrical passage 50 through the valve body 38. The abutting surface 88 of the end cap 84 also provides an abutment for the right end of the spring 76 as shown.

An adjusting screw 90 is provided in the floating valve seat 54 to provide an adjustment of the valve seat 54 on removal of the end cap 92 which again is threaded into a larger diameter portion 94 of the cylindrical passage 50. The end cap 92 is provided with a conical recess 96 for receiving a concial end of the adjusting screw 90 as shown.

The floating valve seat 54 is provided with the O-ring seal 98 extending therearound which permits some radial movement of the valve seat 54. Valve seat 54 is also provided with a passage 100 extending between the recess 58 therein and the chamber 102.

In addition to the chamber 60 which is connected through passage 110 to a source of hydraulic fluid under pressure through conduit 104, an annular chamber 112 is provided in valve body 38 connected through passage 116 to a fluid return conduit 114. The opening 50 in valve body member 38 is connected through passage 106 to a hydraulic fluid under pressure out conduit 108.

As shown, with the spool valve 48 biased to the left in FIG. 1 into contact with the valve seat member 54 and with the adjusting screw 90 properly adjusted, initially the conduit 104 is connected to the conduit 108 and the annular groove 70 of the spool valve 48 is just to the left of the chamber 112 so that the chamber 112 is sealed and there may be a different pressure in the chamber 118 at the right end of the spool valve 48, in the recess 72 and openings 78 and 80 than there is in the chamber 112 until there is movement of the spool valve 48 to the right.

The pilot section 18 of the hydraulic portion 12 of the high-speed valve 10 includes the passages 120 and 122 connected between the chambers 102 and 118 at the opposite ends of the cylindrical opening 50 through the valve body 48 and the pilot valve nozzles 124 and 126. A passage 128 having the metering orifices 130 and 132 therein extends between the passages 120 and 122 as shown. Passage 128 is connected between the orifices 130 and 132 to the chamber 60 through the passage 134.

Nozzles 124 and 126 provide metered openings into the chamber 136 which is connected to the chamber 112 through the passage 138. The nozzles 124 and 126 are operable in conjunction with a flapper member 140 secured to the armature 30 for movement therewith to vary the pressure in the chambers 102 and 118, as will be seen in the consideration of the operation of the high-speed valve 10. The flapper 140 is provided with a damping weight 142 thereon.

In operation of the high-speed valve 10 with an electrical signal applied through the terminals 28 to the coils 22 and 24, the flapper 140 secured to armature 30 for movement therewith about the pivot axis provided by tube 32 is biased to restrict the opening through the nozzle 126 more than the opening through the nozzle 124 is restricted, whereby the pressure in the chamber 118 aids the spring 76 in holding the spool valve 48 to the left in FIG. 1. Thus, with electrical energy to the force motor portion 14 of the valve 10, hydraulic fluid under pressure will be metered through conduit 104, chamber 60, through the passage 50 and out through the passage 106 to conduit 108.

Then, if for any reason the electrical signal to the force motor 28 is cut off so that the armature 30 is rapidly moved into the position shown in FIG. 2 due to the initial bias of the armature 30 by the magnet 26, the nozzle 124 will be more restricted than the nozzle 126 by the flapper 140 to raise the pressure in the chamber 102 and lower the pressure in the chamber 118.

Raising the pressure in the chamber 102 will, through the passage 100, raise the pressure in the recess 58 acting on the end 57 of the spool valve 48 to begin to move the spool valve 48 away from the valve seat member 54. As soon as the end 57 of spool valve 48 starts to move away from the valve seat surface 56, the pressure of the fluid in the chamber 60 will be permitted to go into the recess 58 in the increasing space between the valve seat surface 56 and the end 57 of the spool valve 48 to regeneratively increase the acceleration rate of the spool valve 48 to the right in FIG. 1.

In addition, the lowering of pressure in the chamber 118 reduces the back pressure on the spool valve 48 to increase the speed of movement of the spool valve 48 to the right in FIG. 1. Also, as soon as the valve 48 starts to move to the right in FIG. 1, the groove 70 is open to the chamber 112 whereby the fluid from the chamber 118 may pass through the recess 72, the openings 78 and 80, and the groove 70, into the chamber 112, further regeneratively increasing the acceleration rate of the spool valve 48 as the spool valve 48 is moved to the right.

Such structure and operation provides a particularly fast acting shutoff valve which, when the land 52 passes into the passage 50 on the right side of the chamber 60, as shown will shut off the fluid flow under pressure to the conduit 108. As the valve 48 continues to move to the right, the land 64 will pass into the chamber 112 to connect the conduit 108 and the conduit 114 whereby fluid from conduit 108 will be dumped to the fluid return conduit 114, through the passage 106, the cylindrical opening 50, chamber 112, and passage 116.

The high-speed valve 10 will remain in the shut off configuration as shown in FIG. 2 until the electrical signal is again applied to the valve 10 to move the armature 30 so as to place the flapper 140 in the position illustrated in FIG. 1 and the pressure is lowered in the chamber 60. With these conditions met, the spool valve 48 is returned to the left by the bias of the spring 76 to reset the high-speed shutoff and dump valve 10.

Figure 3:
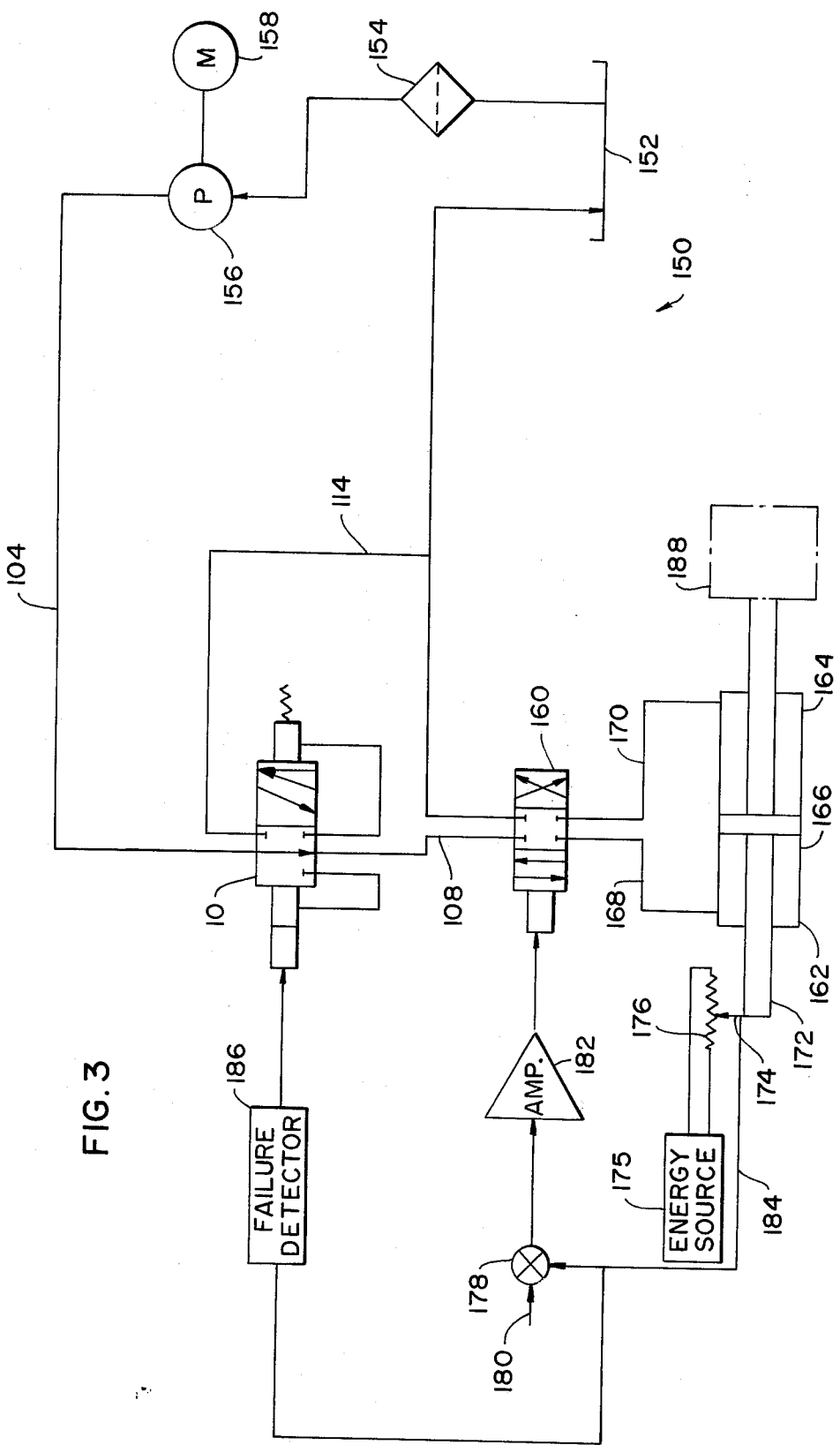
FIG. 3 is a diagrammatic view of a system in which the high-speed shutoff and dump valve of FIGS. 1 and 2 is utilized.

The valve 10 has a plurality of uses and is shown in a typical application in FIG. 3. In the electrohydraulic system 150 shown in FIG. 3, the high-speed shutoff and dump valve 10 is connected to a source of fluid under pressure from reservoir 152 through filter 154 and pump 156 which is driven by motor 158 through conduit 104. The return conduit 114 is connected to both the valve 10 and an electrohydraulic servo valve 160 as well as to the fluid reservoir 152. The conduit 108 from the valve 10 extends between the valve 10 and the electrohydraulic servo valve 160 as shown. The hydraulic fluid under pressure through the valve 10 passes through the electrohydraulic servo valve 160 and is fed to the end 162 or 164 of the hydraulic actuator 166 through the conduit 168 or 170 depending on the actuation of the servo valve 160.

The servo valve 160 is controlled partly in response to the position of the actuator piston rod 172 in accordance with the position of wiper arm 174 on a potentiometer 176 connected to a cource of electrical energy 175. The electrical signal from the wiper arm 174 is connected, through the summing junction 178 where it is combined with the input signal on conductor 180, to provide an output signal to the amplifier 182 which controls the operation of the servo valve 160 and therefore the movement of the piston rod 172.

In operation, if the feedback signal to the summing junction 178 is lost, the loss of such signal will be noted by the failure detector circuit 186 which will then cause the high-speed shutoff valve 10 to actuate as previously indicated to shut off the fluid under pressure through the conduit 104 and to open the conduit 108 to the fluid return conduit 114 whereby hydraulic fluid under pressure is dumped from the actuator 166. The rapid cutoff and dumping as a result of actuation of valve 10 in response to loss of the feedback electrical signal will prevent any damage to the work 188 which might otherwise occur on further movement thereof by the actuator 166.

It will be understood that the valve 10 may be modified and may be used in a system other than the system 150 shown in FIG. 3. For example, the valve 10 may be modified as in FIGS. 4 and 5 and may be positioned between a servo valve 160 and an actuator 166 in a system similar to the system shown in FIG. 3.

Figure 4:
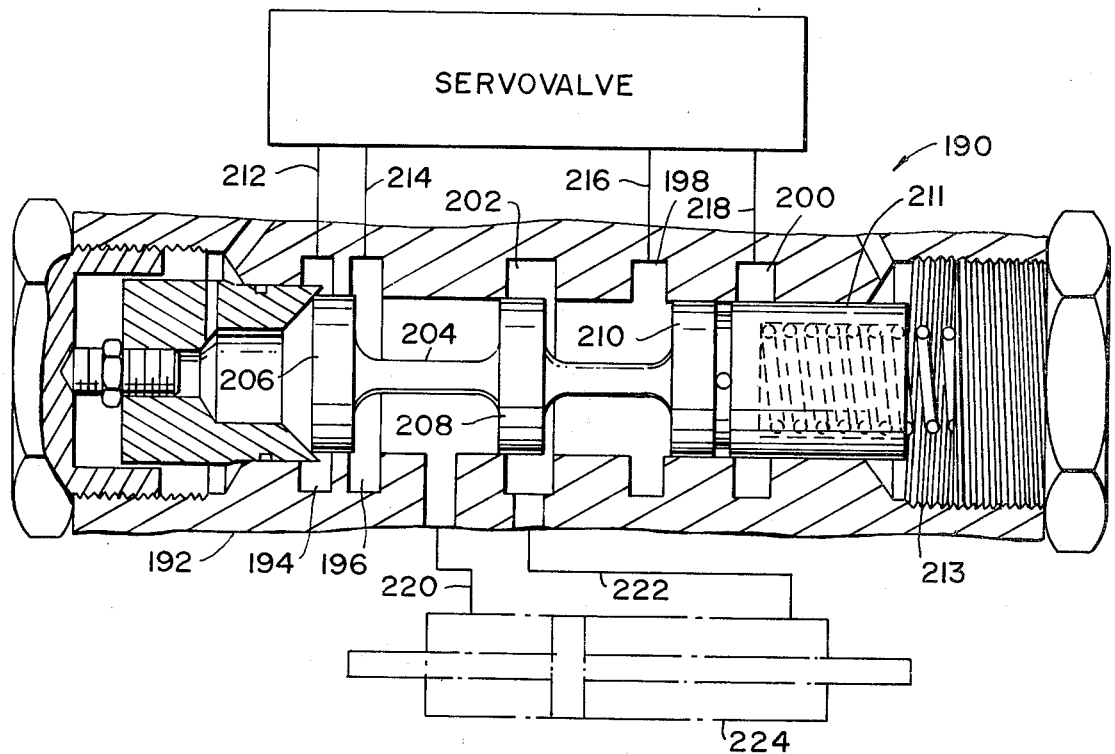
FIG. 4 is a longitudinal section view of the main metering section of a modified high-speed shutoff and dump valve similar to the valve of FIGS. 1 and 2 arranged for use between the electrohydraulic servo valve and hydraulic actuator of FIG. 3, including means for shorting the valve fluid under pressure out to fluid return from the actuator on actuation of the valve.
Figure 5:
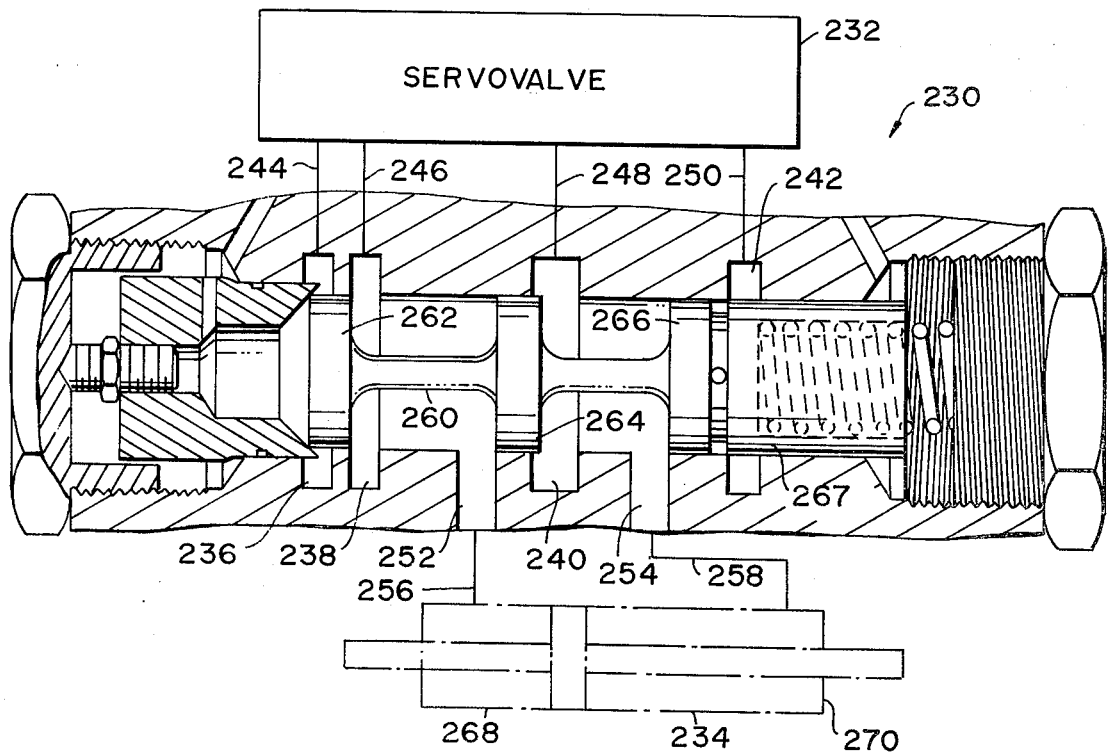
FIG. 5 is a longitudinal sectional view of the main metering section of another modification of the high-speed valve of FIGS. 1 and 2 similar to FIG. 4 whereby the valve fluid under pressure out and fluid return from the actuator are blocked on actuation of the valve.

The modified high-speed valve 190 as shown in FIG. 4 includes the same force motor portion and pilot section of the hydraulic portion as the valve 10. The main metering section 192 of the valve 190 is however provided with a pair of chambers 194 and 196 and a pair of chambers 198 and 200 as well as the chamber 202. Further, the spool valve 204 is provided with four lands 206, 208, 210 and 211 as shown in FIG. 4.

Thus, in operation, when the feedback signal to the servo valve is lost so that the valve 190 operates, the land 206 moves to the right under a regenerative force to connect the high pressure conduits 212 and 214 to effectively shut off the high pressure output of the servo valve. At substantially the same time, the lands 210 and 211 moving to the right cause the back pressure in chamber 213 to be regeneratively reduced through the chamber 200 and return conduit 218 as before. The continued movement of the land 208 to the right blocks the return conduit 216 and shorts the conduits 220 and 222 together. Thus, the pressure on both sides of the actuator 224 is shorted and will be equalized to dump the operating pressure on the actuator.

A similarly modified high-speed valve 230 as shown in FIG. 5 is again placed between a servo valve 232 and a piston and cylinder actuator 234. Again the valve 230 is the same as the valve 10 except for the main metering section. The main metering section includes the chambers 236 and 238 as well as the chambers 240 and 242. The servo valve 232 is connected to the valve 230 through the high pressure conduits 244 and 246 as well as through the return conduits 248 and 250. Actuator 234 is connected to the valve 230 through conduits 256 and 258.

In operation of the valve 230, on loss of the feedback signal to the servo valve 232, the spool 260, again having the four lands 262, 264, 266 and 267, is moved to the right as before. The passage 252 is connected to the fluid return conduit 248 through chamber 240 between the lands 262 and 264 while the conduits 244 and 246 are shorted together through the chambers 236 and 238 to shut off fluid flow under pressure to actuator 234. Further, the conduit 258 and the passage 254 are blocked between the lands 264 and 266. Thus, both ends 268 and 270 of the actuator 234 will have return fluid pressure therein to neutralize the force on the actuator 234 while the fluid pressure inlet from the servo valve 230 is shut off.

While one embodiment and modifications of the high-speed shutoff and dump valve of the invention have been considered in detail herein, it will be understood that other embodiments and modifications of the valve as well as other uses of the valve are contemplated. Thus, for example, the valve seat 56 need not be conical and may in fact be only a cylindrical recess for receiving the cylindrical end of valve 48. Also, the pilot fluid and main metered fluid may be separated and completely different. It is the intention to include all such modifications and embodiments as are defined by the appended claims within the scope of the invention.

What I claim as my invention is:

1. High-speed valve structure comprising a valve body having passages therein for passage of fluid therethrough, means for metering fluid through the passages in the valve body including a valve member in one of the passages movable between an open and a closed position, and means within the valve body and operably associated with the valve member responsive to initial movement of the valve member toward a closed position for regeneratively increasing the acceleration rate of the valve member toward the closed position.

2. Structure as set forth in claim 1 wherein the means for regeneratively increasing the acceleration rate of the valve member toward the closed position includes means within the valve body and operably associated with the valve member for increasing the pressure on one portion of the valve member tending to move the valve member toward the closed position.

3. Structure as set forth in claim 1 wherein the means for regeneratively increasing the acceleration rate of the valve member toward a closed position comprises means within the valve body and operably associated with the valve member for relieving back pressure on one portion of the valve member tending to resist movement of the valve member toward the closed position.

4. Structure as set forth in claim 3 wherein the means for relieving back pressure on one portion of the valve member comprises a chamber open to return fluid pressure surrounding the valve member and means operable between the chamber and the one portion of the valve member for metering progressively more fluid from adjacent the one portion of the valve member to the chamber in response to progressive movement of the valve member toward the closed position thereof.

5. Structure as set forth in claim 1 wherein the valve member is a spool valve and further including a valve seat for sealing one end of the spool valve which is movable with respect to the spool valve.

6. Structure as set forth in claim 5 and further including means positioned between the valve body and valve seat and operable therebetween for adjusting at least one limiting position of the valve seat.

7. Structure as set forth in claim 1 wherein the high-speed valve structure includes means operably connected to the valve member for shutting off flow of fluid under pressure thereinto on movement of the valve member to a closed position.

8. Structure as set forth in claim 7 wherein the high-speed valve structure further includes means operably connected to the valve member for dumping hydraulic fluid under pressure out to return hydraulic fluid from the valve structure on movement of the valve member to a closed position.

9. Structure as set forth in claim 7 wherein the high-speed valve structure further includes means operably connected to the valve member for shorting hydraulic fluid under pressure out to return hydraulic fluid to the valve structure on movement of the valve member to a closed position.

10. Structure as set forth in claim 7 wherein the high-speed valve structure further includes means operably connected to the valve member for blocking hydraulic fluid under pressure out of the valve and return hydraulic fluid to the valve on movement of the valve member to a closed position.

11. High-speed valve structure comprising a valve body having passages therein for passage of fluid therethrough, means for metering fluid through the passages in the valve body including a spool valve member in one of the passages movable between an open and closed position, and means within the valve body and operably associated with the valve member responsive to initial movement of the valve member toward a closed position for regeneratively increasing the acceleration rate of the valve member toward the closed position comprising means within the valve body and operatively associated with the valve member for increasing the pressure on the one portion of the valve member tending to move the valve member toward the closed position comprising a valve seat positioned adjacent one end of the valve member and in sealing engagement therewith with the valve member in an open position, which valve seat has a recess in one side thereof opening toward the one end of the valve member and a chamber open to fluid pressure into the valve structure surrounding the one end of the valve member and receiving the one side of the valve seat whereby on initial movement of the one end of the valve member toward a closed position the fluid pressure in is provided in the recess to act against the one end of the valve member and provide pressure on the one end of the valve member related to the opening between the one end of the valve member and the valve seat.

12. Structure as set forth in claim 11 wherein the means for regeneratively increasing the acceleration rate of the valve member toward a closed position comprises means within the valve body and operably associated with the valve member for relieving back pressure on one portion of the valve member tending to resist movement of the valve member toward the closed position.

13. Structure as set forth in claim 12 wherein the means for relieving back pressure on one portion of the valve member comprises a chamber open to return fluid pressure surrounding the valve member and means operable between the chamber and the one portion of the valve member for metering progressively more fluid from adjacent the one portion of the valve member to the chamber in response to progressive movement of the valve member toward the closed position thereof.

14. Structure as set forth in claim 11 wherein the valve member is a spool valve and further including a valve seat for sealing one end of the spool valve which is movable with respect to the spool valve.

15. Structure as set forth in claim 14 and further including means positioned between the valve body and valve seat and operable therebetween for adjusting at least one limiting position of the valve seat.

16. Structure as set forth in claim 11 wherein the high-speed valve structure includes means operably connected to the valve member for shutting off flow of fluid under pressure thereinto on movement of the valve member to a closed position.

17. Structure as set forth in claim 16 wherein the high-speed valve structure further includes means operably connected to the valve member for dumping hydraulic fluid under pressure out to return hydraulic fluid from the valve structure on movement of the valve member to a closed position.

18. Structure as set forth in claim 16 wherein the high-speed valve structure further includes means operably connected to the valve member for shorting hydraulic fluid under pressure out ot return hydraulic fluid to the valve structure on movement of the valve member to a closed position.

19. Structure as set forth in claim 16 wherein the high speed valve structure further includes means operably connected to the valve member for blocking hydraulic fluid under pressure out of the valve and return hydraulic fluid to the valve on movement of the valve member to a closed position.

* * * * *